United States Patent
Ko et al.

(10) Patent No.: US 9,197,568 B2
(45) Date of Patent: Nov. 24, 2015

(54) METHOD FOR PROVIDING QUALITY OF SERVICE IN SOFTWARE-DEFINED NETWORKING BASED NETWORK AND APPARATUS USING THE SAME

(71) Applicant: ELECTRONICS AND TELECOMMUNICATIONS RESEARCH INSTITUTE, Daejeon (KR)

(72) Inventors: Nam Seok Ko, Daejeon (KR); Hwan Jo Heo, Daejeon (KR); Sung Kee Noh, Daejeon (KR); Sung Jin Moon, Daejeon (KR); Woo Sug Jung, Daejeon (KR); Byung Ho Yae, Daejeon (KR); Tae Soo Chung, Daejeon (KR); Jong Dae Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 102 days.

(21) Appl. No.: 14/060,459

(22) Filed: Oct. 22, 2013

(65) Prior Publication Data
US 2014/0112150 A1 Apr. 24, 2014

(30) Foreign Application Priority Data

Oct. 22, 2012 (KR) .................. 10-2012-0117195
Oct. 21, 2013 (KR) .................. 10-2013-0125060

(51) Int. Cl.
*H04L 12/851* (2013.01)

(52) U.S. Cl.
CPC .................. *H04L 47/24* (2013.01)

(58) Field of Classification Search
CPC .................................................. H04L 47/24
USPC ......... 370/392, 235, 389, 229, 401, 468, 216, 370/230, 231, 232, 236, 400; 709/220, 223, 709/224, 225, 235, 238, 242
See application file for complete search history.

(56) References Cited

U.S. PATENT DOCUMENTS

| | | | | |
|---|---|---|---|---|
| 6,977,932 | B1* | 12/2005 | Hauck | 370/392 |
| 7,313,141 | B2* | 12/2007 | Kan et al. | 370/394 |
| 8,547,853 | B2* | 10/2013 | Du et al. | 370/241 |
| 8,743,704 | B2* | 6/2014 | Nishi | 370/242 |
| 2002/0141403 | A1* | 10/2002 | Akahane et al. | 370/389 |
| 2002/0150041 | A1* | 10/2002 | Reinshmidt et al. | 370/216 |
| 2002/0186660 | A1* | 12/2002 | Bahadiroglu | 370/248 |
| 2003/0037042 | A1* | 2/2003 | Kametani | 707/3 |

(Continued)

FOREIGN PATENT DOCUMENTS

KR 10-2012-0055955 A 6/2012

*Primary Examiner* — Parth Patel

(57) ABSTRACT

Disclosed is a Quality of Service (QoS) providing method and apparatus in a software-defined networking (SDN) based network, the QoS providing method including receiving a first packet of a predetermined flow, searching for forwarding information corresponding to the packet and QoS rule information corresponding to the packet in a forwarding table and a QoS rule table, respectively, transmitting the packet to a controller if the forwarding information and the QoS rule information do not exist in the forwarding table and the QoS rule table, and generating a flow entry corresponding to the packet in a flow learning table based on forwarding information and QoS rule information that are received from the controller, thereby efficiently providing QoS.

14 Claims, 9 Drawing Sheets

(56) References Cited

U.S. PATENT DOCUMENTS

| | | | |
|---|---|---|---|
| 2003/0048785 A1* | 3/2003 | Calvignac et al. | 370/392 |
| 2004/0003107 A1* | 1/2004 | Barham et al. | 709/235 |
| 2004/0225916 A1* | 11/2004 | Clark | 714/25 |
| 2006/0036551 A1* | 2/2006 | Oliveira et al. | 705/51 |
| 2006/0165376 A1* | 7/2006 | Park | 386/83 |
| 2007/0115848 A1* | 5/2007 | Chean et al. | 370/252 |
| 2007/0121636 A1* | 5/2007 | Kim et al. | 370/392 |
| 2007/0133547 A1* | 6/2007 | Ko et al. | 370/392 |
| 2007/0206591 A1* | 9/2007 | Doviak et al. | 370/389 |
| 2008/0162723 A1* | 7/2008 | Zhao et al. | 709/242 |
| 2009/0105850 A1* | 4/2009 | Miyata et al. | 700/28 |
| 2009/0138577 A1* | 5/2009 | Casado et al. | 709/220 |
| 2010/0278042 A1* | 11/2010 | Monnes et al. | 370/230 |
| 2011/0080830 A1* | 4/2011 | Ko et al. | 370/235 |
| 2011/0219142 A1* | 9/2011 | Lin et al. | 709/235 |
| 2011/0261825 A1* | 10/2011 | Ichino | 370/400 |
| 2012/0324573 A1* | 12/2012 | Kim et al. | 726/22 |
| 2013/0051234 A1* | 2/2013 | Matsuoka | 370/235 |
| 2013/0343181 A1* | 12/2013 | Stroud et al. | 370/229 |
| 2013/0343377 A1* | 12/2013 | Stroud et al. | 370/389 |

\* cited by examiner

METHOD FOR PROVIDING QUALITY OF SERVICE IN SOFTWARE-DEFINED NETWORKING BASED NETWORK AND APPARATUS USING THE SAME

CLAIM FOR PRIORITY

This application claims priority to Korean Patent Application No. 10-2012-0117195 filed on Oct. 22, 2012 and No. 10-2013-0125060 filed on Oct. 21, 2013 in the Korean Intellectual Property Office (KIPO), the entire contents of which are hereby incorporated by reference.

BACKGROUND

1. Technical Field

Example embodiments of the present invention relate in general to the field of software-defined networking, and more particularly, to a method and apparatus for providing Quality of Service (QoS) applied to a software-defined networking based network.

2. Related Art

In a general network, a single device incorporating a control plane and a data plane operates as a network element. Such network devices form the entire network by distribution, and traffic forwarding is determined through exchange of a control protocol between control planes of each network device, which requires high complexity of the network device. In addition, the inside of each network device is configured using a specific technology of a manufacturer, and is not open to the public in most cases, which leads to an exclusive dependency on the manufacturer when the network device needs to have a new function added thereto or improve a previous function.

OpenFlow allows for development of a new network technology by changing the existing networking technology, which is not open to the public, into an open networking technology. The OpenFlow technology allows the path of packets in a switch to be determined by software run by an external control device, regardless of equipment manufacturers, by separating a packet forward functionality from a control functionality in a network switch (or a router), and providing a standardized protocol for communication between the two functionalities.

Meanwhile, ONF (Open Networking Foundation) established to promote the use and standardization of the Open-Flow technology defines software-defined networking (SDN) technology based on the OpenFlow technology.

The SDN technology separates a control plane from a data plane and mounts most functionalities on a control plane of an SDN controller such that a network device such as a switch or a router has a simple structure to process packets according to a rule provided by the control plane in a unit of a flow through a standardized protocol, such as an OpenFlow protocol, thereby fundamentally resolving network expenses and complexity, and also fundamentally changing the hardware and software technology of the existing networking technology.

However, as for the SDN network, most of the control functionalities are performed by the centralized SDN controller, and thus all rules need to be delivered from the SDN controller when providing Quality of Service (QoS) for packets incoming into a network device, and thus traffic between the SDN controller and the network device is increased and the processing load of the SDN controller is increased.

SUMMARY

Accordingly, example embodiments of the present invention are provided to substantially obviate one or more problems due to limitations and disadvantages of the related art.

Example embodiments of the present invention provide a QoS providing method for efficiently providing QoS in a software-defined networking based network.

Example embodiments of the present invention also provide a QoS providing apparatus for executing the QoS providing method.

In some example embodiments, a method of providing QoS by a node in a network includes receiving a first packet of a predetermined flow; searching for forwarding information corresponding to the packet and Quality of Service (QoS) rule information corresponding to the packet in a forwarding table and a QoS rule table, respectively; transmitting the packet to a controller if the forwarding information and the QoS rule information do not exist in the forwarding table and the QoS rule table; and generating a flow entry corresponding to the packet in a flow learning table based on forwarding information and QoS rule information that are received from the controller.

Each of units of the forwarding information and the QoS rule information received from the controller may be configured to be different from a unit of the flow entry generated in the flow learning table.

In the generating of the flow entry, a microflow entry may be generated.

In other example embodiments, a method of providing QoS by a node in a network, includes searching for flow information corresponding to a received packet in a flow learning table; searching for, if the flow information does not exist in the flow learning table, forwarding information corresponding to the packet and QoS rule information corresponding to the packet in a forwarding table and a QoS rule table, respectively; obtaining, if at least one piece of information of the forwarding information and the QoS rule information does not exist in the forwarding table and the QoS rule table, the at least one piece of information from a controller; and allowing the flow learning table to be subject to learning using at least one of information obtained from at least one of the forwarding table and the QoS rule table and information obtained from the controller.

The method may further include, if the forwarding information and the QoS rule information exist in the forwarding table and the QoS rule table, respectively, obtaining forwarding information that is to be applied to the packet and QoS rule information that is to be applied to the packet from the forwarding table and the QoS rule table, respectively; allowing the flow learning table to be subject to learning using the obtained forwarding information and QoS rule information; and processing the packet by use of the obtained forwarding information and QoS rule information.

The obtaining of the at least one piece of information from the controller may include, if the forwarding information exists in the forwarding table and the QoS rule information does not exist in the QoS rule table, sending the controller a message to request an update of the QoS rule information; allowing the flow learning table to be subject to learning using the QoS rule information provided from the controller and the forwarding information obtained from the forwarding table; and processing the packet based on the QoS rule information provided from the controller and the forwarding information obtained from the forwarding table.

The obtaining of the at least one piece of information from the controller may include, if the forwarding information does not exist in the forwarding table and the QoS rule information exists in the QoS rule table, sending the controller a message to request an update of the forwarding information; allowing the flow learning table to be subject to learning using the forwarding information provided from the controller and the QoS rule information obtained from the QoS rule table; and processing the packet based on the forwarding information provided from the controller and the QoS rule information obtained from the Qos rule table.

The obtaining of the at least one piece of information from the controller may include, if the forwarding information does not exist in the forwarding table and the QoS rule information does not exist in the QoS rule table, sending the controller a message to request updates of the forwarding information and the QoS rule information; allowing the flow learning table to be subject to learning using the forwarding information and the QoS rule information provided from the controller; and processing the packet based on the forwarding information and the QoS rule information provided from the controller.

The method may further include calculating a packet arrival interval of each of packets incoming in a unit of a flow; and allowing information regarding the calculated packet arrival interval to be included in a header of the packet, and forwarding the packet including the packet arrival interval information to another node. In the forwarding of the packet including the packet arrival interval information, in a case in which the packet is an Internet protocol (IP) packet, a software-defined networking (SDN) header may be added between a medium access control (MAC) header and an IP header of the IP packet, and the packet arrival interval information may be included in the SDN header.

The method may further include comparing an arrival time of packets incoming in a unit of a flow with an arrival estimation time calculated with respect to a flow of the packets; and sending the controller a message indicating that a traffic congestion occurs in the flow of the packets if the arrival time of the packet is earlier than the arrival estimation time. In the comparing of the arrival time of the packets incoming in a unit of a flow with the arrival estimation time calculated with respect to the flow of the packets, the arrival time of the packet may be determined based on the packet arrival interval information included in the header of the packet, and the arrival time of the packet may be compared with the arrival estimation time.

In still other example embodiments, an apparatus for providing QoS includes a storage unit and a packet processing unit. The storage unit may include a forwarding table including forwarding information of a packet, a QoS rule table including QoS rule information that is applied to the packet, and a flow learning table that is subject to learning based on the forwarding information and the QoS rule information. The packet processing unit may be configured to perform forwarding on an incoming packet and apply QoS to the incoming packet, based on information stored in the storage unit.

The packet processing unit may receive a first packet of a predetermined flow, search for forwarding information corresponding to the packet and Quality of Service (QoS) rule information corresponding to the packet in the forwarding table and the QoS rule table, respectively, transmit the packet to a controller if the forwarding information and the QoS rule information do not exist in the forwarding table and the QoS rule table, and generate a flow entry corresponding to the packet in the flow learning table based on forwarding information and QoS rule information that are received from the controller.

The packet processing unit may search for flow information corresponding to a received packet in the flow learning table, and if the flow information does not exist in the flow learning table, search for forwarding information corresponding to the received packet and QoS rule information corresponding to the received packet in the forwarding table and the QoS rule table, respectively, and if at least one piece of information of the forwarding information and the QoS rule information does not exist in the forwarding table and the QoS rule table, obtain the at least one piece of information from the controller, and allow the flow learning table to be subject to learning using at least one of information obtained from at least one of the forwarding table and the QoS rule table and information obtained from the controller.

As is apparent from the above, with the method and apparatus for providing QoS in a software-defined networking based network, each node manages the forwarding information separately from the QoS rule information by use of a flow learning table, a forwarding table, and a QoS rule table, and allows the flow learning table to be subject to learning by use of the forwarding information and the QoS rule information and to be used for packet forwarding and application of QoS to packets, thereby providing QoS in units of microflows.

In addition, according to the present invention, the number of messages exchanged between each node and the controller is reduced by use of the flow learning table, thereby improving the overall network performance and providing the SDN network with scalability.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
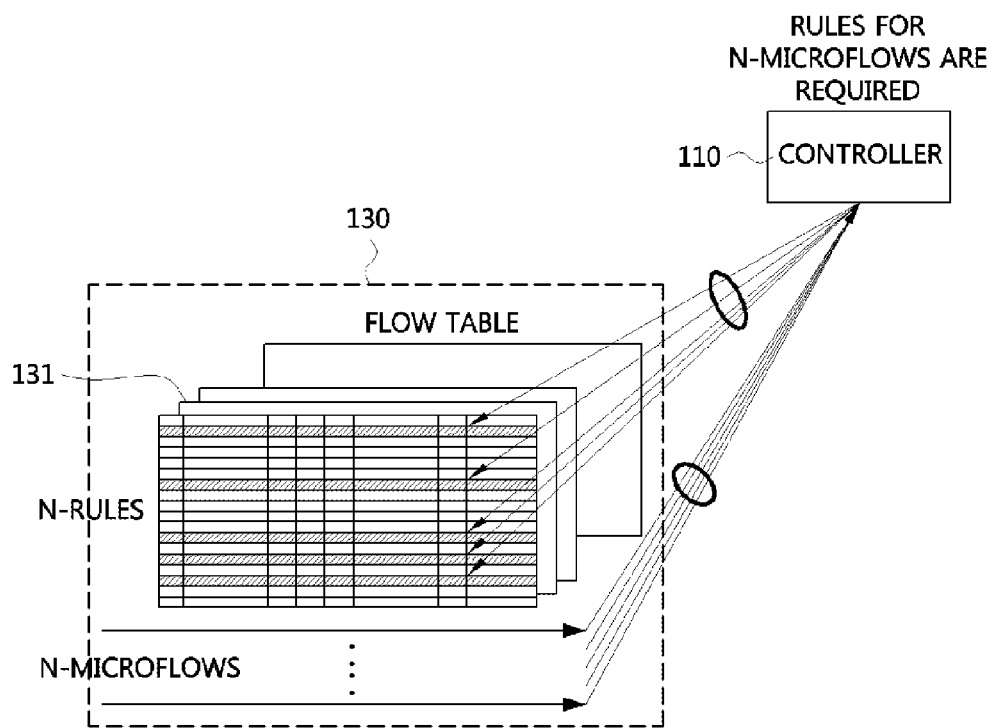
FIG. 1 is a conceptual diagram illustrating a method of processing flows in an SDN based network.

Example embodiments of the present invention are disclosed herein. However, specific structural and functional details disclosed herein are merely representative for purposes of describing example embodiments of the present invention, and thus example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will be described in detail herein. It should be understood, however, that there is no intent to limit the invention to the particular forms disclosed, but on the contrary, the invention is to cover all modifications, equivalents, and alternatives falling within the spirit and scope of the invention. Like reference numerals refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in reverse order, depending upon the functionality/acts involved.

Hereinafter, embodiments of the present invention will be described in detail with reference to the accompanying drawings. For clarity, elements that appear in more than one drawing or in more than one place in the description are consistently denoted by the same respective reference numerals, and such elements are only described in detail once, to avoid redundancy.

FIG. 1 is a conceptual diagram illustrating a method of processing a flow in an SDN based network.

Referring to FIG. 1, a software-defined networking (SDN) based network includes a controller 110 and a plurality of nodes 130.

Each node 130 may be provided using a network device that forwards traffic in practice, for example, a switch or a router, and include various types of flow tables 131.

Each node 130, if a first packet of each flow is received, searches a flow table corresponding to the first packet to process the first packet.

The node 130, if a rule corresponding to the received first packet is not registered in the flow table, transmits all or a portion of the first packet to the controller 110 in the form of a message, and receives a rule regarding the flow table of the first packet so as to update the flow table 131. Here, a flow represents a set of packets having a transmission control protocol (TCP) connection, a certain medium access control (MAC) or Internet protocol (IP) address, and the same virtual local area network (VLAN) value.

When the node 130 processes an IP packet and provides QoS, such as bandwidth control in a unit of a microflow that is divided based on 5-tuple of an IP header (an IP source address, an IP destination address, a protocol, a TCP/UDP source port number, and a TCP/UDP destination port number), the node 130 needs to perform a procedure of transmitting packets for N-microflows to the controller 110 as shown in FIG. 1, and receiving N-rules for N-microflows from the controller 110. In this case, not only the number of messages transmitted to the controller 110 but also the number of rules is increased as much as the microflows.

The present invention provides a method of a node efficiently providing QoS by use of a forwarding table, a Qos rule table, and a flow learning table in an SDN based network so as to resolve the above disadvantage.

Figure 2:
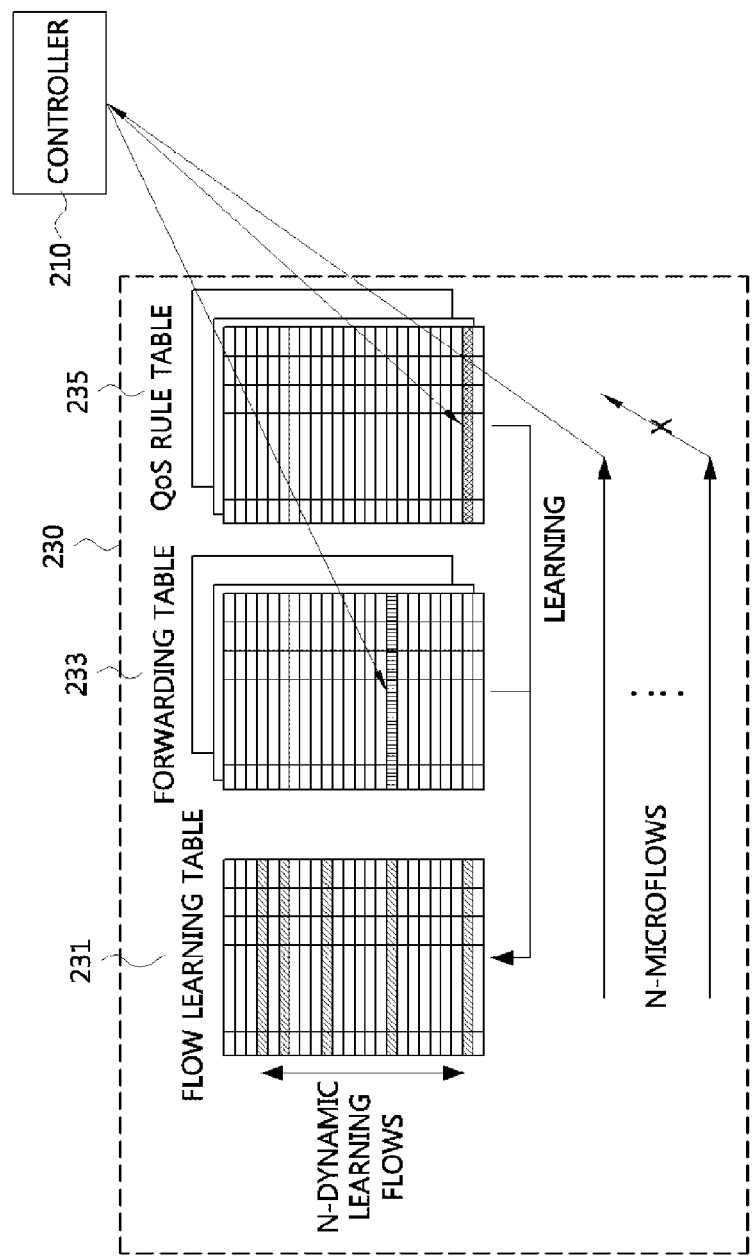
FIG. 2 is a conceptual diagram illustrating a method of providing QoS in accordance with an example embodiment of the present invention.

FIG. 2 is a conceptual diagram illustrating a method of providing QoS in accordance with an example embodiment of the present invention.

Referring to FIG. 2, with a method of providing QoS according to an example embodiment of the present disclosure, each node 230 includes a flow learning table 231, a forwarding table 233, and a QoS rule table 235.

That is, the node 230 in accordance with the present invention allows the forwarding table 233 and the QoS rule table 235 to manage forwarding information and QoS rule information, respectively, instead of using the existing flow table in which forwarding information and QoS rule information are mixed with each other, and manages the flow learning table 231 that learns and maintains flow forwarding information and QoS rule information for each microflow, so that the number of messages exchanged with a controller 210 can be reduced, thereby efficiently forwarding traffic and providing QoS.

The flow learning table 231 is configured to dynamically manage each microflow by use of a hash table based on 5-tuple fields of an IP header serving as a unit for distinguishing microflows, for example, an IP source address, an IP destination address, a protocol, a TCP/UDP source port number, and a TCP/UDP destination port number. However, the method of dividing microflows in the flow learning table 231 is not limited to the hash table, and may be implemented using other types of tables, for example, a tree structure. In addition, information used to divide microflows is not limited to the 5-tuple separator of an IP packet header. As an example, microflows may be divided in consideration of another field in addition to the 5-tuple information. As another example, microflows may be divided without using a certain field among the 5-tuples.

Since each node 230 according to the present invention allows forwarding information and QoS rule information to be respectively managed in the tables 233 and 235 that are separated from each other, a unit for providing forwarding information is distinguished from a unit for proving QoS rule information for application thereof.

In addition, since each node 230 according to the present invention allows QoS learning for each microflow to be additionally performed, a unit for providing forwarding information or QoS rule information is differently provided from a unit for managing QoS and status by preventing the unit for providing forwarding information and QoS rule information from being associated with the unit for managing QoS and status as in the conventional packet processing method.

For example, in accordance with an example embodiment of the present disclosure, forwarding information and QoS rule information are provided in larger units, and QoS and status are managed in units of microflows.

Figure 3:
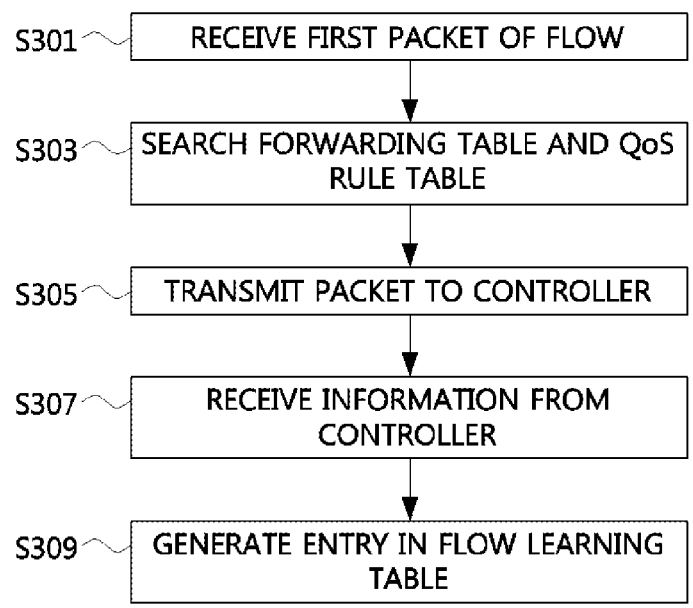
FIG. 3 is a flowchart showing a process of creating an entry of a flow learning table in an SDN based network in accordance with an example embodiment of the present invention.

FIG. 3 is a flowchart showing a process of creating an entry of a flow learning table in an SDN based network in accordance with an example embodiment of the present invention, showing an operation of a node when a first packet of each flow enters the node.

Referring to FIG. 3, if the first packet of each flow enters a certain node (S301), the node searches for forwarding information and QoS rule information corresponding to the first packet in a forwarding table and a QoS rule table (S303).

The node, after searching in the forwarding table and the QoS rule table, determines whether corresponding pieces of information exist in the tables, and if determined that the forwarding information and the QoS rule information do not exist, transmits all or a portion of the first packet to a controller as in the conventional SDN structure (S305).

Thereafter, the node receives information regarding the forwarding table and the QoS rule table from the controller (S307), and based on the received information, generates an entry for a corresponding microflow in a flow learning table (S309). In this case, as described above, the unit for forwarding information, the unit for QoS rule information, and the unit for a flow learning table may be different from one another. For example, the forwarding information may be provided in a unit of an IP destination address, the QoS rule information may be provided in a unit of Differentiated Service Code Point (DSCP), and the flow learning table may be managed on a microflow basis.

Accordingly, when an IP destination address of a packet is same but other field values except the IP destination address among 5-tuples are different, the packet is managed as a different microflow. In addition, QoS rule information related to a DSCP value may be generally applied to all traffic having the same DSCP value, or individually applied to each flow having the same DSCP value. For example, as for a DSCP value 10, QoS rule information may define a bandwidth limit with respect to the sum of all traffic each having a DSCP value of 10, or may define a bandwidth limit with respect to an individual flow having a DSCP value of 10.

Meanwhile, as the above process is performed with respect to the first packet of a predetermined flow, the forwarding information and QoS rule information are learned by the flow learning table, so that the remaining packets included in the predetermined flow are forwarded according to the corresponding information learned by the flow learning table.

Figure 4:
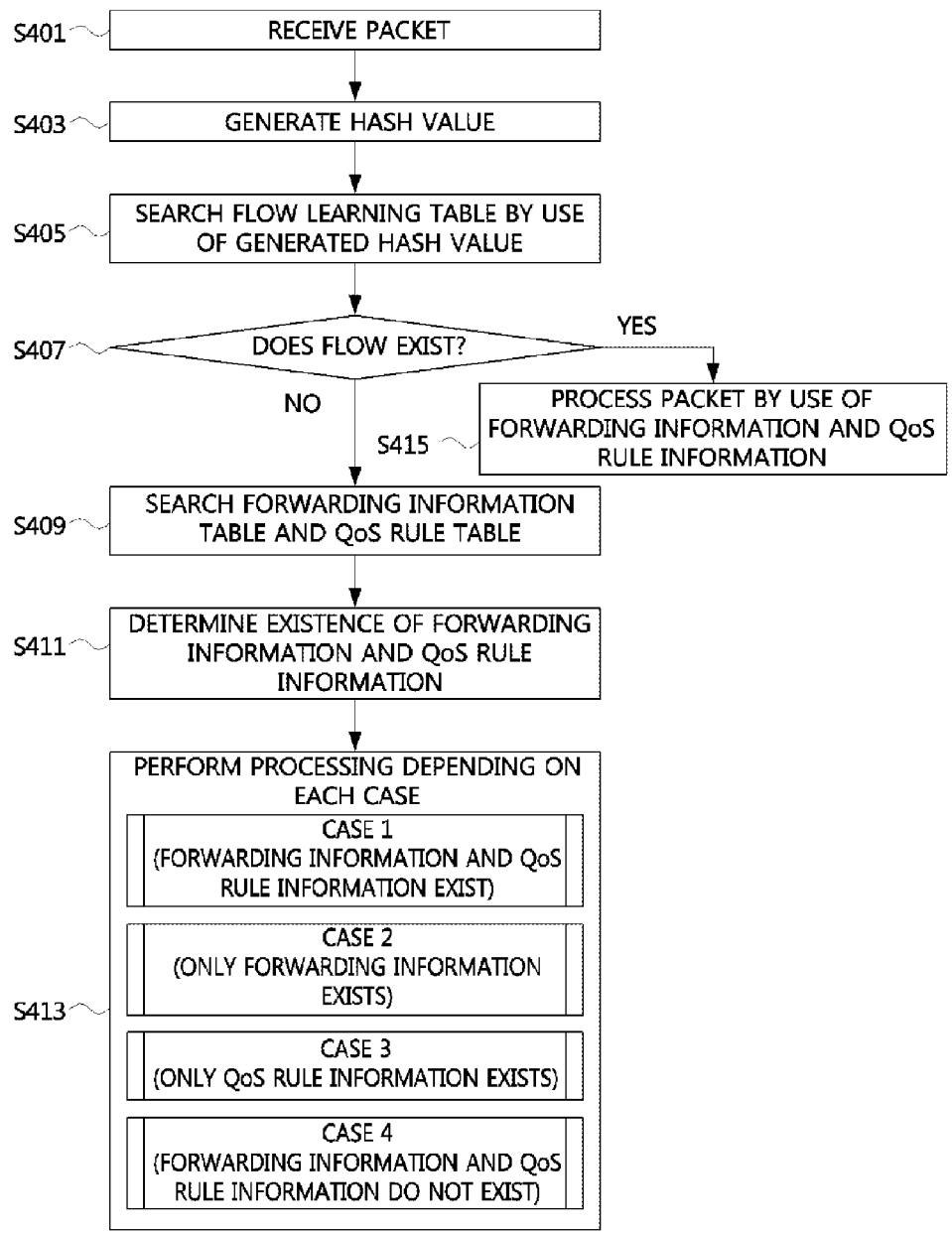
FIG. 4 is a flowchart showing a method of providing QoS performed by each node in an SDN based network in accordance with an example embodiment of the present disclosure.

FIG. 4 is a flowchart showing a method of providing QoS by each node in an SDN based network in accordance with an example embodiment of the present disclosure.

Referring to FIG. 4, when a packet enters a node through an external interface (S401), the node generates a hash value to distinguish a flow corresponding to the packet (S403). Here, 5-tuple information included in a header of the packet to distinguish microflows is generally used as a key value (or a hash value), but a unit (granularity) smaller or larger than 5-tuple information may be configured. To this end, a field of a packet header may be added or deleted. In addition, various functions, such as CRC-32, may be used as a hash function, and is not limited thereto. In accordance with the present invention, the use of a certain hash function is not defined.

After generation of the hash value, the node, first searches for a flow corresponding to the incoming packet in a flow learning table by use of the generated hash value (S405), and determines whether the flow corresponding to the incoming packet exists (S407). If the incoming packet is a first packet of a certain flow, the flow corresponding to the incoming packet does not exist in the flow learning table.

If determined in operation S407 that the flow corresponding to the incoming packet does not exist, the node searches for forwarding information and QoS rule information corresponding to the incoming packet in a forwarding table and a QoS rule table, respectively (S409). In addition, if determined in operation S407 that the flow corresponding to the incoming packet exists, the node obtains forwarding information and QoS rule information from the flow, and processes the packet according to the obtained information (S415).

Subsequently, the node determines whether forwarding information and QoS rule information corresponding to the incoming packet exist (S411). Here, the following four cases may be provided depending on the determination, and the node performs a packet processing corresponding to each case (S413).

Case 1) Forwarding information is included in a forwarding table, and QoS rule information exists in a QoS rule table.

Case 2) Forwarding information is included in a forwarding table, but QoS rule information does not exist in a QoS rule table.

Case 3) Forwarding information is not included in a forwarding table, but QoS rule information exists in a QoS rule table.

Case 4) Forwarding information is not included in a forwarding table, and QoS rule information does not exist in a QoS rule table.

Hereinafter, a method of a node processing a packet depending on each of four cases shown in FIG. 4 will be described with reference to FIGS. 5 to 8.

Figure 5:
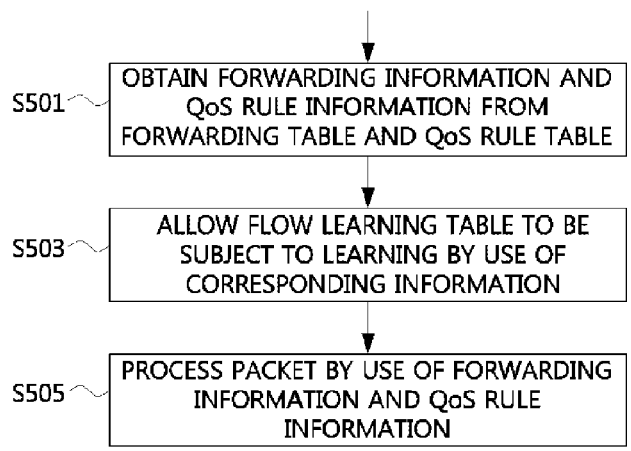
FIG. 5 is a flowchart showing a processing method in case 1 of FIG. 4.

FIG. 5 is a flowchart showing a processing method of case 1 shown in FIG. 4. Referring to FIG. 5, since case 1 represents that forwarding information of the packet exists in the forwarding table, and QoS rule information of the packet exists in the QoS rule table, the node obtains the forwarding information and QoS rule information of the packet from the forwarding table and the QoS rule table, respectively (S501), and allows a flow learning table to be subject to learning based on the obtained forwarding information and QoS rule information (S503).

In addition, the node applies QoS to the incoming packet and forwards the packet, according to the obtained forwarding information and QoS rule information (S505).

Although operation S505 is illustrated as being performed after operation S503 in FIG. 5, this is taken only as an example for convenience of description, and the sequence of performing operations S503 and S505 is not limited thereto. For example, operations S503 and S505 may be simultaneously performed.

Figure 6:
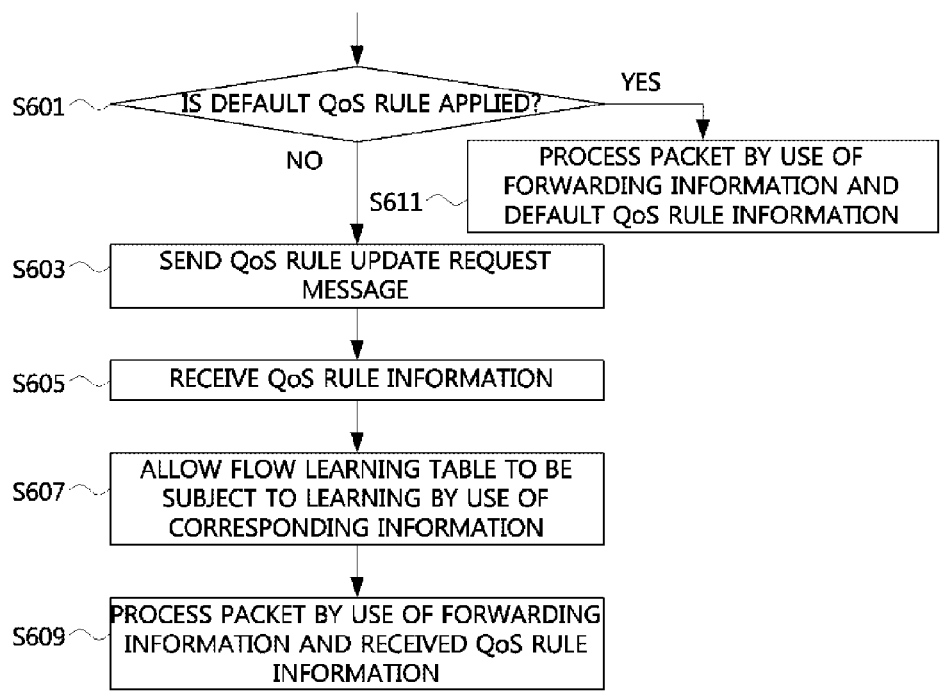
FIG. 6 is a flowchart showing a processing method in case 2 of FIG. 4.

FIG. 6 is a flowchart showing a processing method of case 2 shown in FIG. 4. Referring to FIG. 6, case 2 represents that forwarding information of the packet exists in the forwarding table but QoS rule information of the packet does not exist in the QoS rule table. In this case, the node determines whether to apply a QoS rule that is set as default to the packet, or to send the controller a message to request an update of a QoS rule (S601). Here, the QoS rule set as default may represent, for example, a best effort service. In addition, operation S601 may be optionally performed. That is, for case 2, the node may be configured to instantly send the controller a message to request an update of a QoS rule without performing operation S601.

If determined in operation S601 that the node does not to apply the QoS rule set as default, the node sends the controller a request message to update a QoS rule of the packet (S603). Herein, the node may send the controller a message including information for requesting only a QoS rule of the packet, along with all or a portion of the packet. The controller having received the QoS rule update request message transmits the QoS rule information to the node.

The node receives the QoS rule information of the packet from the controller (S605). Then, the node obtains the forwarding information of the packet from the forwarding table, and allows the flow learning table to be subject to learning by use of the obtained forwarding information and the QoS rule information, which is received from the controller (S607).

Thereafter, the node applies QoS to the packet and forwards the packet according to the forwarding information and QoS rule information of the packet (S609).

If determined in operation S601 that the QoS rule set as default is applied, the node processes the packet by use of the default QoS rule and the forwarding information which is obtained from the forwarding table (S611).

Figure 7:
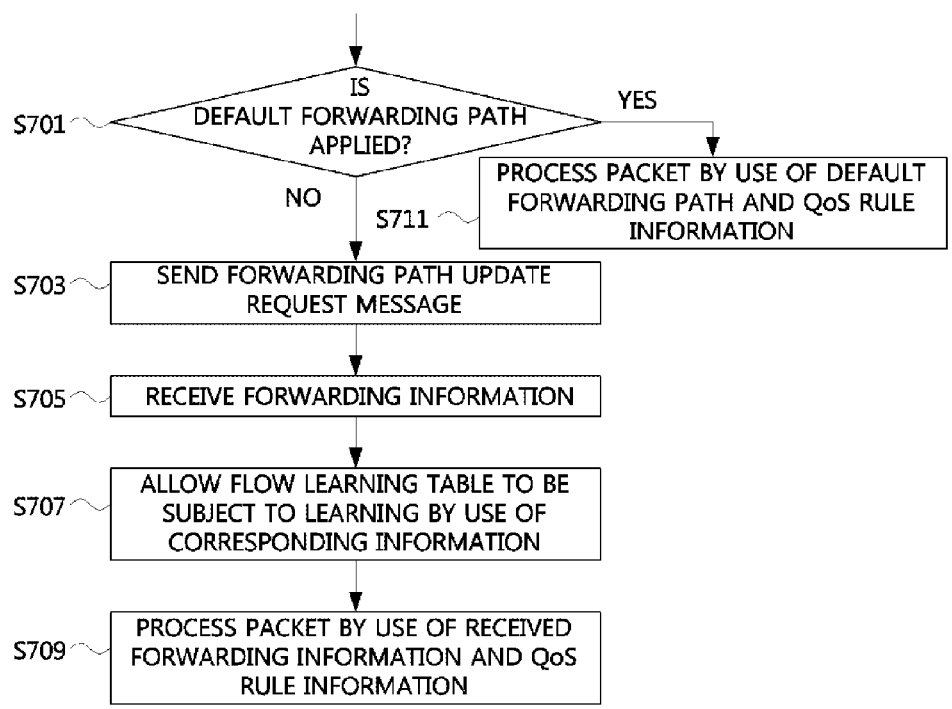
FIG. 7 is a flowchart showing a processing method in case 3 of FIG. 4.

FIG. 7 is a flowchart showing a processing method of case 3 shown in FIG. 4.

Referring to FIG. 7, case 3 represents that QoS rule information that may be applied to the packet exists in the QoS rule table but forwarding information does not exist in the forwarding table. In this case, the node determines whether to apply a forwarding path set as default to the packet or to send the controller a message to request an update of a forwarding path (S701). In this case, operation S701 may be optionally performed. That is, for case 3, the node may be configured to instantly send the controller a request message to update a forwarding path without performing operation S701.

If determined in operation S701 that the node does not to apply the forwarding path set as default, the node sends the controller a request message to update a forwarding path of the packet (S703). Herein, the node may send the controller a message including information for requesting only forwarding path information of the packet, along with all or a portion of the packet. The controller having received the forwarding path update request message transmits forwarding information to the node.

The node receives the forwarding information of the packet from the controller (S705).

Then, the node obtains the QoS rule information, which is to be applied to the packet, from the QoS rule table, and allows the flow learning table to be subject to learning by use of the obtained QoS rule information and the forwarding information of the packet, which is received from the controller (S707).

Thereafter, the node applies QoS to the packet and forwards the packet, according to the forwarding information and QoS rule information of the packet (S709).

Meanwhile, if determined in operation S701 that the forwarding path information set as default is applied to the packet, the node processes the packet by use of the default forwarding path information and the QoS rule information obtained from the QoS rule table (S711).

Figure 8:
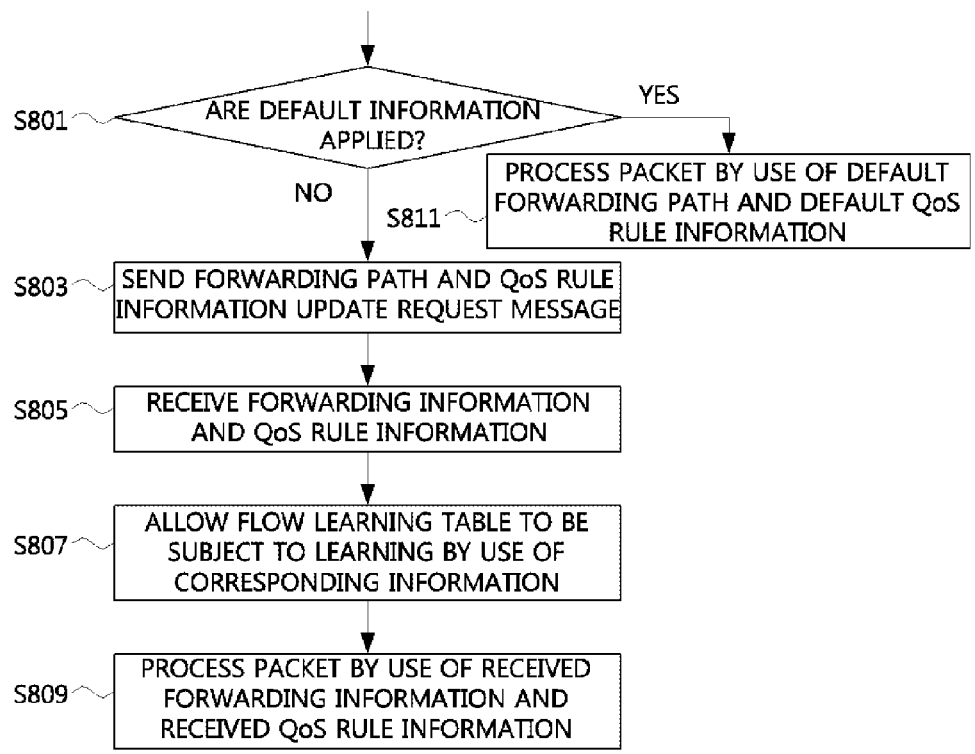
FIG. 8 is a flowchart showing a processing method in case 4 of FIG. 4.

FIG. 8 is a flowchart showing a processing method of case 4 shown in FIG. 4.

Referring to FIG. 8, case 4 represents that forwarding information of the packet does not exist in the forwarding table and QoS rule information that may be applied to the packet does not exist in the QoS rule table. In this case, the node determines whether to apply a forwarding path and a QoS rule that are set as default, or to send the controller a message to request updates of a forwarding path and a QoS rule (S801). Here, operation S801 may be optionally performed. That is, for case 4, the node may be configured to instantly send the controller a message to request a forwarding path update and a QoS rule update without performing operation S801.

If determined in operation S801 that the node does not to apply the forwarding path and QoS rule set as default, the node sends the controller a request message to update a forwarding path and a QoS rule of the packet (S803). Herein, the node may send the controller a message including information for requesting both of forwarding information and QoS rule information of the packet, along with all or a portion of the packet. The controller having received the forwarding path and QoS rule update request message transmits the forwarding information and the QoS rule information to the node.

The node receives the forwarding information and the QoS rule information of the packet from the controller (S805).

Thereafter, the node allows the flow learning table to be subject to learning by use of the forwarding information and the QoS rule information that are received from the controller (S807).

Thereafter, the node applies QoS to the packet and forwards the packet according to the forwarding information and QoS rule information of the packet (S809).

Meanwhile, if determined in operation S801 that the forwarding path and QoS rule set as default are applied, the node processes the packet by use of the default forwarding path information and QoS rule (S811).

QoS processing applied to the method of providing QoS in accordance with an example embodiment of the present invention may mainly include service types of a bandwidth guaranteed service and a fairness providing service, and the QoS requirements may vary depending on the service type.

The bandwidth guaranteed service represents a service in which a packet is guaranteed to be serviced at a service time that is fixed based on a length of a packet and a requested bandwidth. The fairness providing service represents a service in which bandwidths are equally divided for each flow.

In order to guarantee the above described QoS according to the present invention, if a bandwidth is determined for each flow, a node determines a packet arrival interval $t\_\Delta$ according to the determined bandwidth, and calculates an arrival estimation time of a next packet based on the determined packet arrival interval $t\_\Delta$. Thereafter, the node, if the next packet arrives in practice, determines whether to accept or discard the next packet based on the previously calculated arrival estimation time, thereby guaranteeing QoS. Here, the bandwidth for each flow may be configured to vary with time. In addition, as for the first packet of each flow, the arrival estimation time may be set as the time of a node at which the first packet arrives.

Figure 9:
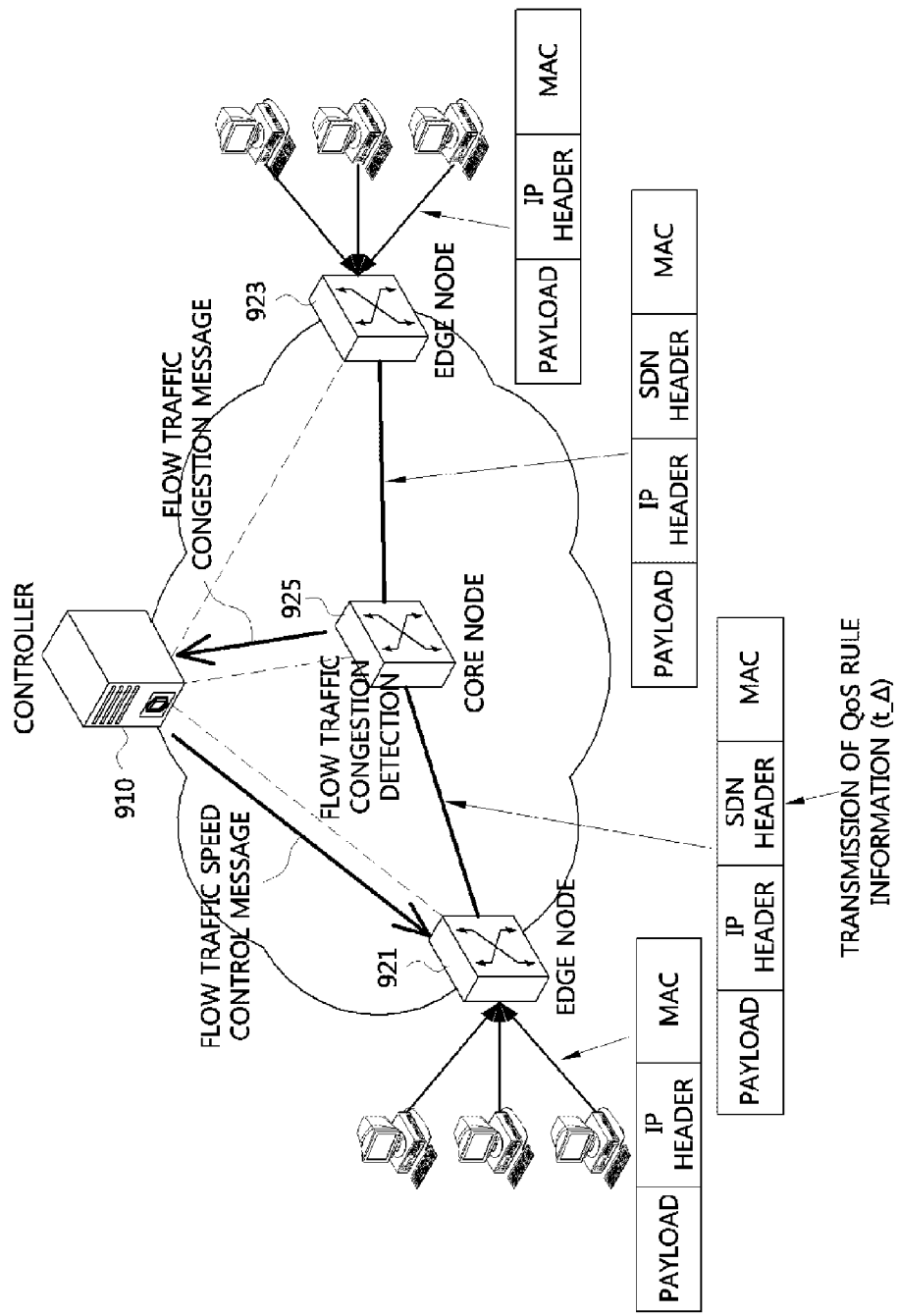
FIG. 9 is a conceptual diagram illustrating a method of providing QoS in accordance with an example embodiment of the present invention.

FIG. 9 is a conceptual diagram illustrating a method of providing QoS in accordance with an example embodiment of the present invention.

Referring to FIG. 9, in accordance with an example embodiment of the present invention, in order to efficiently provide QoS, nodes forming a SDN network are divided into edge nodes 921 and 923 and a core node 925. Here, the edge nodes 921 and 923 are nodes that are located at a boundary of the SDN network and may be connected to a plurality of subscriber terminals. In addition, the core node 925 is a node that is located inside the SDN network and serves to connect edge nodes to each other, an edge node and another core node to each other, or core nodes to each other. For simplification of the description of FIG. 9, the core node 925 is illustrated as connecting the two edge nodes 921 and 923 to each other. In addition, the plurality of edge nodes 921 and 923 and the core node 925 forming the SDN network are connected to a controller 910.

As described above, the edge node 921, if a bandwidth for each flow is allocated, calculates a packet arrival interval t_Δ, of each of packets incoming in a unit of a flow, allows information of the calculated packet arrival interval t_Δ in a header of the packet, and forwards the packet including the packet arrival interval information to a next node.

In detail, as shown in FIG. 9, if the packet entering the edge node 921 is an Ethernet Internet protocol (IP) packet, the edge node 921 defines a software-defined networking (SDN) header between a medium access control (MAC) header and an IP header, allows packet arrival interval information t_Δ, to be included in the SDN header as QoS rule information, and forwards the packet to the next node (for example, the core node 925 in FIG. 9). Here, the size and the detailed format of the SDN header may be variously defined.

The core node 925, upon reception of the packet including the SDN header having the packet arrival interval information t_Δ, compares an arrival time of the received packet with an arrival estimation time that is calculated with respect to a flow of the packet to determine whether the arrival time of the received packet is earlier than the arrival estimation time or not.

If determined that the packet has arrived earlier than the arrival estimation time, the core node 925 sends the controller 910 a traffic congestion notification message indicating that traffic congestion occurs in the flow corresponding to the received the packet. Here, the core node 925 may be configured to send the controller 910 a traffic congestion notification message instantly when the packet enters earlier than the arrival estimation time of the packet. Alternatively, the core node 925 may be configured to send the controller 910 a traffic congestion notification message in a case where packets continuously and rapidly enter the node above a predetermined threshold. In addition, the core node 925 may be set to instantly discard packets related to the traffic congestion, or configured to perform a DSCP marking on packets related to the traffic congestion. In a case where traffic congestion occurs, the controller 910 may provide each of the nodes 921, 923, and 925 with a method of processing the corresponding packet, and the controller 910 may provide each of the nodes 921, 923, and 925 with a packet processing method according to a preset QoS management policy.

With respect to the packet accepted by the core node 925 as described above, the core node 925 updates an arrival estimation time η of a next packet in the same flow, by use of the packet arrival interval t_Δ, as shown in Equation 1.

$$\eta = \eta + t\_\Delta \quad \text{[Equation 1]}$$

Meanwhile, if the controller 910 receives a traffic congestion notification message from a certain node, the controller 910 transmits a flow transmission speed control message to control a flow transmission speed to a node prior to the node, at which traffic congestion occurs with respect to a flow corresponding to the congestion; for example, the controller 910 may transmit the flow transmission speed control message to a node which has forwarded a packet to the node, at which traffic congestion occurs. The flow transmission speed control message may include an appropriate transmission speed for the flow, and the appropriate transmission speed may be set by the controller 910.

The node having received the flow transmission speed control message from the controller 910, for example, the edge node 921 in FIG. 9 calculates a packet arrival interval t_Δ of each packet based on the transmission speed information included in the flow transmission speed control message.

Figure 10:
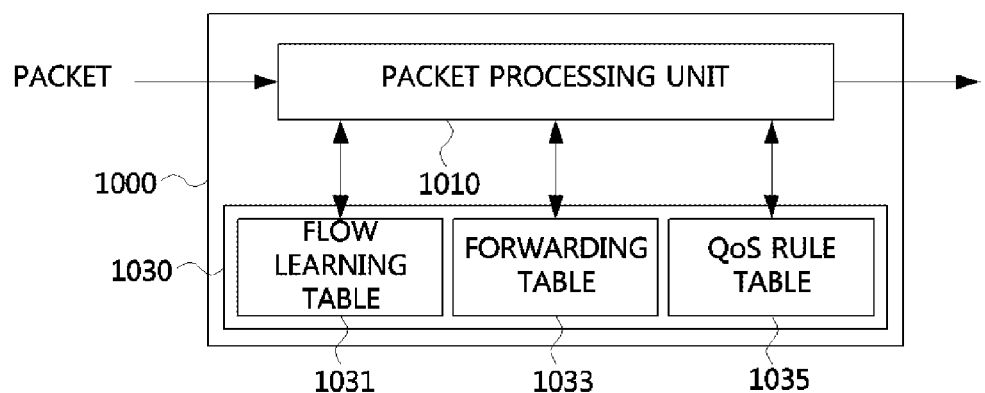
FIG. 10 is a block diagram illustrating a configuration of an apparatus for executing a QoS providing method in accordance with an example embodiment of the present invention.

FIG. 10 is a block diagram illustrating a configuration of an apparatus for executing a QoS providing method in accordance with an example embodiment of the present invention, in which the apparatus may be the node described as the above.

Referring to FIG. 10, a node 1000 in accordance with an example embodiment of the present disclosure may include a storage unit 1030 and a packet processing unit 1010.

The storage unit 1030 may include a flow learning table 1031, a forwarding table 1033, and a QoS rule table 1035 as shown in FIG. 2. The forwarding table 1033 and the QoS rule table 1035 include forwarding information and QoS rule information that are provided from a controller, respectively, and the flow learning table 1031 includes information that is learned at the node 1000, based on information included in the forwarding table 1033 and the QoS rule table 1035 or forwarding information or QoS rule information provided from the controller.

The packet processing unit 1010 performs processing to provide QoS in a unit of a microflow based on the header information of the incoming packet as described through FIGS. 3 to 10.

In detail, the packet processing unit 1010, upon entering of a first packet of a predetermined flow, searches for forwarding information corresponding to the packet and a Quality of Service (QoS) rule corresponding to the packet in the forwarding table 1033 and the QoS rule table 1035, respectively, transmits all or a portion of the first packet to the controller so as to receive information about the forwarding table 1033 and the QoS rule table 1035 from the controller if determined that the forwarding information and the QoS rule information do not exist in the forwarding table 1033 and the QoS rule table 1035, and generates an entry for a corresponding microflow in the flow learning table 1031 based on the received information.

In addition, the packet processing unit 1010, upon incoming of a packet, generates a hash value to distinguish a flow corresponding to the incoming packet, searches for a flow corresponding to the incoming packet in the flow learning table 1031 by use of the generated hash value, and if determined that the flow corresponding to the incoming packet does not exist, searches for forwarding information corresponding to the incoming packet and QoS rule information corresponding to the incoming packet in the forwarding table 1033 and the QoS rule table 1035, respectively. Thereafter, the packet processing unit 1010 determines the existence of the forwarding information and the QoS rule information corresponding to the incoming packet as described through FIGS. 4 to 8, and performs the packet processing depending on each of the four cases.

In addition, the packet processing unit 1010 included in an edge node calculates, if a bandwidth is allocated for each flow, a packet arrival interval t_Δ of each packet incoming in a unit of a flow, allows the calculated packet arrival interval information t_Δ to be included in a header of the packet, and forwards the packet to the next node as shown in FIG. 9.

In addition, the packet processing unit 1010 included in a core node determines, upon reception of the packet including a SDN header including the packet arrival interval information t_Δ, an arrival time of the packet based on the packet arrival interval included in the header of the received packet, and compares the determined arrival time of the packet with an arrival estimation time that is calculated with respect to a flow corresponding to the packet to determine whether traffic congestion occurs in the flow corresponding to the received packet, and if determined that traffic congestion occurs, sends the controller a traffic congestion notification message. In addition, the packet processing unit 1010 may perform processing (for example, discarding or DSCP marking) on a packet that is related to the traffic congestion according to a predetermined policy.

In addition, the packet processing unit 1010 included in the edge node or the core node may perform, upon reception of the flow transmission speed control message from the controller, a packet processing on the packet based on the transmission speed information included in the received flow transmission speed control message.

While the example embodiments of the present invention and their advantages have been described in detail, it should be understood that various changes, substitutions, and alterations may be made herein without departing from the scope of the invention.

What is claimed is:

1. A method of generating a flow entry by a node in a network, the method comprising:
   receiving a first packet of a predetermined flow;
   searching for forwarding information corresponding to the first packet and Quality of Service (QoS) rule information corresponding to the first packet in a forwarding table and a QoS rule table, respectively;
   transmitting the first packet to a controller if at least one piece of information of the forwarding information and the QoS rule information does not exist in the forwarding table and the QoS rule table;
   receiving the at least one piece of information from the controller; and
   generating a flow entry corresponding to the first packet in a flow learning table based on information obtained from at least one of the forwarding table and the QoS rule table and the at least one piece of information received from the controller,
   wherein the node manages the forwarding table, the QoS rule table and the flow learning table, separately.

2. The method of claim 1, wherein a unit of the forwarding information and a unit of the QoS rule information received from the controller are different from a unit of the flow entry generated in the flow learning table.

3. The method of claim 1, wherein the generating of the flow entry comprises generating a microflow entry.

4. A method of providing QoS by a node in a network, the method comprising:
   searching for flow information corresponding to a received packet of a predetermined flow in a flow learning table;
   searching for, if the flow information does not exist in the flow learning table, forwarding information corresponding to the packet and QoS rule information corresponding to the packet in a forwarding table and a QoS rule table, respectively;
   transmitting, if at least one piece of information of the forwarding information and the QoS rule information does not exist in the forwarding table and the QoS rule table, the packet to a controller;
   receiving the at least one piece of information from the controller; and
   allowing the flow learning table to be subject to learning using information obtained from at least one of the forwarding table and the QoS rule table and the at least one piece of information received from the controller,
   wherein the node manages the forwarding table, the QoS rule table and the flow learning table, separately.

5. The method of claim 4, if the forwarding information and the QoS rule information exist in the forwarding table and the QoS rule table, respectively, further comprising:
   obtaining forwarding information that is to be applied to the packet and QoS rule information that is to be applied to the packet from the forwarding table and the QoS rule table, respectively;
   allowing the flow learning table to be subject to learning using the obtained forwarding information and QoS rule information; and
   processing the packet by use of the obtained forwarding information and QoS rule information.

6. The method of claim 4, wherein, if the forwarding information exists in the forwarding table and the QoS rule information does not exist in the QoS rule table, the obtaining of the at least one piece of information from the controller comprises:
   sending the controller a message to request an update of the QoS rule information;
   allowing the flow learning table to be subject to learning using the QoS rule information provided from the controller and the forwarding information obtained from the forwarding table; and
   processing the packet based on the QoS rule information provided from the controller and the forwarding information obtained from the forwarding table.

7. The method of claim 4, wherein, if the forwarding information does not exist in the forwarding table and the QoS rule information exists in the QoS rule table, the obtaining of the at least one piece of information from the controller comprises:
   sending the controller a message to request an update of the forwarding information;
   allowing the flow learning table to be subject to learning using the forwarding information provided from the controller and the QoS rule information obtained from the QoS rule table; and
   processing the packet based on the forwarding information provided from the controller and the QoS rule information obtained from the QoS rule table.

8. The method of claim 4, wherein, if the forwarding information does not exist in the forwarding table and the QoS rule information does not exist in the QoS rule table, the obtaining of the at least one piece of information from the controller comprises:
   sending the controller a message to request updates of the forwarding information and the QoS rule information;
   allowing the flow learning table to be subject to learning using the forwarding information and the QoS rule information provided from the controller; and
   processing the packet based on the forwarding information and the QoS rule information provided from the controller.

9. The method of claim 4, further comprising:
   calculating a packet arrival interval of the received packet of the predetermined flow; and allowing information regarding the calculated packet arrival interval to be included in a header of the packet, and forwarding the packet including the packet arrival interval information to another node.

10. The method of claim 9, wherein in the forwarding of the packet including the packet arrival interval information, in a case in which the packet is an Internet protocol (IP) packet, a software-defined networking (SDN) header is added between a medium access control (MAC) header and an IP header of the IP packet, and the packet arrival interval information is included in the SDN header.

11. The method of claim 4, further comprising:
comparing an arrival time of a packet of a flow with an arrival estimation time calculated with respect to the flow; and
sending the controller a message indicating that a traffic congestion occurs in the flow if the arrival time of the packet is earlier than the arrival estimation time.

12. The method of claim 11, wherein in the comparing of the arrival time of the packet of the flow with the arrival estimation time, the arrival time of the packet is determined based on packet arrival interval information included in a header of the packet, and the arrival time of the packet is compared with the arrival estimation time.

13. An apparatus for providing QoS, the apparatus comprising:
a storage unit including a forwarding table including forwarding information of a packet, a QoS rule table including QoS rule information that is applied to the packet, and a flow learning table that is subject to learning based on the forwarding information and the QoS rule information; and
a packet processing unit configured to perform forwarding on an incoming packet and apply QoS to the incoming packet, based on information stored in the storage unit, wherein the packet processing unit receives a first packet of a predetermined flow, searches for forwarding information corresponding to the first packet and Quality of Service (QoS) rule information corresponding to the first packet in the forwarding table and the QoS rule table, respectively, transmits the first packet to a controller if at least one piece of information of the forwarding information and the QoS rule information corresponding to the first packet does not exist in the forwarding table and the QoS rule table, receives the at least one piece of information from the controller, and generates a flow entry corresponding to the first packet in the flow learning table based on information obtained from at least one of the forwarding table and the QoS rule table and the at least one piece of information received from the controller, and
wherein the storage unit manages the forwarding table, the QoS rule table and the flow learning table, separately.

14. The apparatus of claim 13, wherein the packet processing unit searches for flow information corresponding to the first packet in the flow learning table, and if the flow information does not exist in the flow learning table, searches for the forwarding information corresponding to the first packet and the QoS rule information corresponding to the first packet in the forwarding table and the QoS rule table, respectively, and if at least one piece of information of the forwarding information and the QoS rule information does not exist in the forwarding table and the QoS rule table, obtains the at least one piece of information from the controller, and allows the flow learning table to be subject to learning using the information obtained from at least one of the forwarding table and the QoS rule table and the at least one piece of information obtained from the controller.

* * * * *